US006137635A

United States Patent [19]

Nakazawa

[11] Patent Number: 6,137,635

[45] Date of Patent: Oct. 24, 2000

[54] PROJECTOR APPARATUS

[75] Inventor: Kimiaki Nakazawa, Saitama, Japan

[73] Assignee: Fuji Photo Optical Co., Ltd., Omiya, Japan

[21] Appl. No.: 09/356,552

[22] Filed: Jul. 19, 1999

[30] Foreign Application Priority Data

Jul. 23, 1998 [JP] Japan ................................ 10-208015

[51] Int. Cl.[7] ................................................ G02B 27/10

[52] U.S. Cl. ......................... 359/621; 359/618; 359/619; 353/22; 353/31; 349/5; 349/7

[58] Field of Search .................................... 359/618, 619, 359/621; 353/22, 31, 33, 34, 37, 69; 349/5, 7, 8, 9

[56] References Cited

U.S. PATENT DOCUMENTS 4,043,641 8/1977 Gottlieb .
4,909,601 3/1990 Yajima et al. .......................... 350/331
5,353,156 10/1994 Chung ..................................... 359/649
5,757,505 5/1998 Mizutani ................................ 356/400
5,967,635 10/1999 Tani et al. ................................ 353/20

FOREIGN PATENT DOCUMENTS 53-74319 7/1978 Japan .
9-33881 2/1997 Japan .

*Primary Examiner*—Georgia Epps
*Assistant Examiner*—Tim Thompson
*Attorney, Agent, or Firm*—Arnold International; Bruce Y. Arnold

[57] ABSTRACT

To correct on-axis chromatic aberration of a projection lens easily and at low cost by using a transparent plate between an optical modulator for a primary color component and a beam combining optical system. When a standard projection lens 11 having a medium focal length is used, parallel-plane glass plates 27, 28, and 29 of the same thickness (1 mm for example) may be inserted in each component beam. However, when the projection lens is changed to one having a different focal length, at least one of the parallel-plane glass plates is replaced in order to suppress the occurrence of on-axis chromatic aberration for that color component caused by the change in focal length.

9 Claims, 2 Drawing Sheets

PROJECTOR APPARATUS

BACKGROUND OF THE INVENTION

A liquid crystal projector that modulates illuminating light with a specified image signal using a liquid crystal display and which magnifies and projects the modulated light onto a screen is conventionally known (e.g., see Japanese Laid Open Patent Application H9-33881).

It is desirable to have the projection lens used with a liquid crystal display be approximately telecentric on the reducing side of the projection lens, as the liquid crystal display requires that the light illuminating its back side be orthogonal to the surface of the display for proper operation of the display. In the case where such a liquid crystal display is used with a projection lens that is not telecentric on the reducing side, there is unnecessary reduction in the amount of light in the periphery of the displayed image.

In recent years, color liquid crystal projectors which can accept projection lenses with different focal lengths to enable various kinds of presentations to be given have been in demand. Improvement in the image quality as well as a reduction in cost of the equipment has been desired. Further, on-axis chromatic aberration of the projection lens, resulting in deviations in the imaging position among different color components, has been a cause of image degradation using color liquid crystal projectors.

Because the reduction side of a projection lens for use with liquid crystal displays that modulate each of three color components of a color image is usually made to be approximately telecentric, on-axis chromatic aberration is commonly corrected by adjusting the distance from each liquid crystal display to the screen. If however, the projection lens is changed to one having a different focal length, the on-axis chromatic aberration occurs anew. Moreover, if the lens is changed to a telescopic lens having a long focal length, the on-axis chromatic aberration will not be tolerable in the displayed image. Although a method exists which corrects for chromatic aberration by using an abnormal dispersion glass in the projection lens, a large cost increase results when this method is used, making it difficult to satisfy the demand for reducing the cost.

In the TV camera field, a TV camera is known where a correction plate is arranged facing against a prism surface and aberrations are corrected by this correction plate (see Japanese Laid Open Patent Application 53-74319). However, in this type of TV camera optical system, the reduction side of the lens doesn't have to be approximately telecentric as in the projector apparatus of the present invention, making the concept of on-axis chromatic aberration correction completely different.

BRIEF SUMMARY OF THE INVENTION

A first object of the present invention is to provide a projector apparatus that can correct on-axis chromatic aberration of a projection lens easily at a low cost. A second object of the invention is to enable on-axis chromatic aberration to be easily corrected at low cost even in the case of a projector apparatus that allows projection lenses of different focal lengths to be interchanged for the purpose of changing the magnification or viewing format.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

This invention relates to a projector apparatus that uses optical modulators, such as a liquid crystal displays, to impart image information onto a screen. Specifically, it relates to a projector apparatus where three primary color light beams (hereinafter referred to as components or component beams) that are given image information by respective optical modulators are synthesized by a beam combining optical system, such as a dichroic cross-mirror type prism, and wherein the combined light beam is enlarged and projected onto a screen by a projection lens designed to receive illuminating light on its reducing side that is approximately telecentric.

The projector of this invention is equipped with three optical modulators which are each positioned to modulate a respective one of three color components, such as red, green, and blue. Each respective optical modulator imparts image information for a respective color component according to an input image signal for that color component. A beam combining optical system, such as a dichroic cross-mirror type prism combines the differently colored component beams, and a projection lens designed to be illuminated by light on its reducing side that is approximately telecentric enlarges the combined beam and projects it onto a screen. A transparent plate, which can correct the on-axis chromatic aberration of the projection lens, is arranged between the beam combining optical system and at least one of the optical modulators.

Also, it is possible to construct the projector such that the transparent plate is arranged along the path of only one of the component beams, such as between the optical modulator that modulates red light, for example, and the beam combining optical system. It is preferred that the transparent plate consists of a glass plate having sides that are planar and parallel. Furthermore, it is desirable that the projector apparatus be constructed so that the transparent plate may be easily replaced either using a transparent plate having the same index of refraction and a different thickness, or by a transparent plate having a different index of refraction.

Three different embodiments of the projector of the present invention will now be described with reference to the drawings.

EMBODIMENT 1

Figure 1:
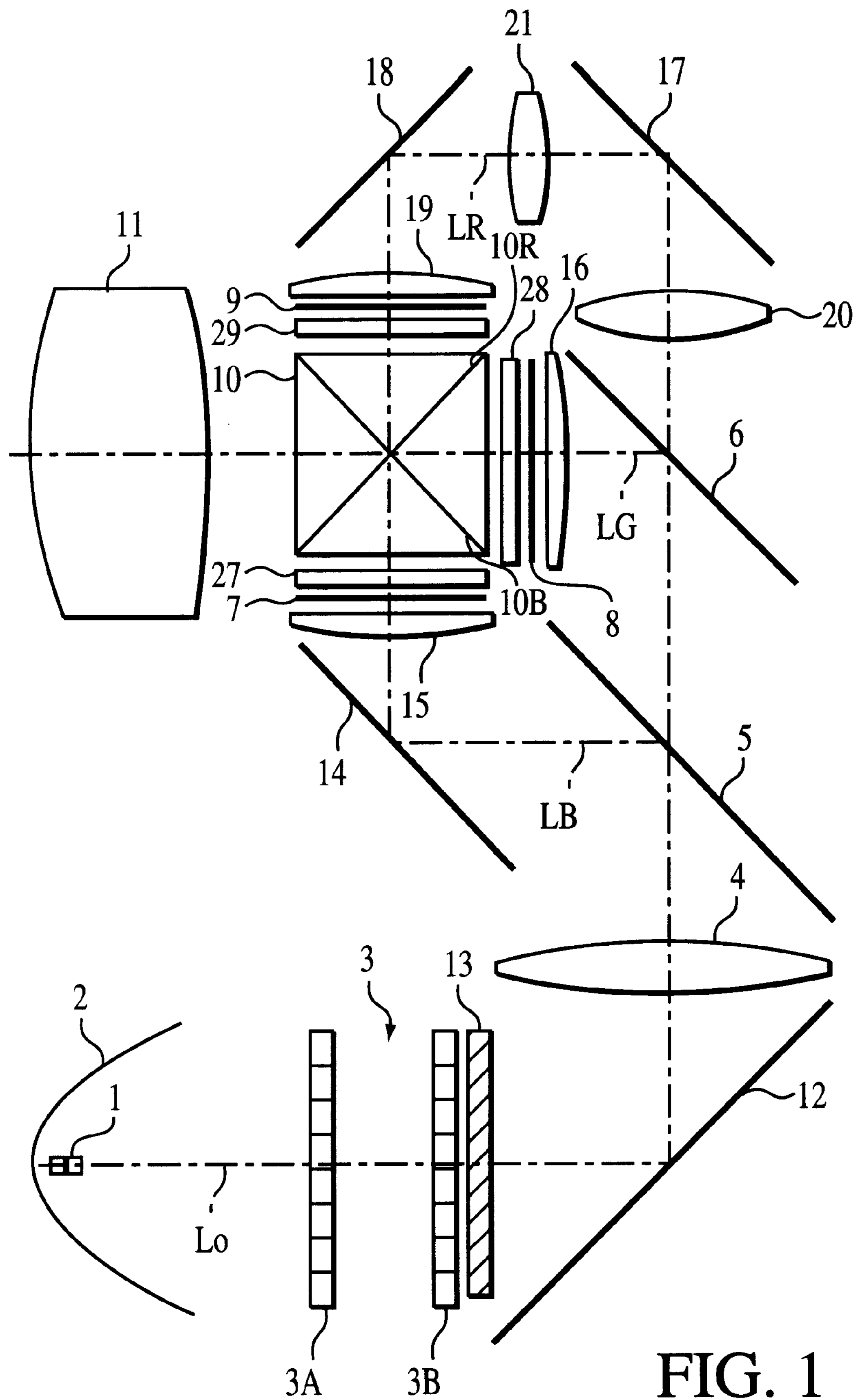
FIG. 1 shows the structure of a projector apparatus according to Embodiment 1.

FIG. 1 shows the construction of a liquid crystal projector apparatus according to Embodiment 1. As shown in FIG. 1, the projector apparatus includes: an emitter 1 that emits white light and a reflector 2, such as a parabolic mirror to reflect the white light from the emitter 1; an integrator 3, formed of lenticular lens arrays 3A and 3B, which homogenizes the light emitted from the emitter 1 throughout a cross section perpendicular to the optical axis; a condenser lens 4 to collect the output light from the integrator 3; a first dichroic mirror 5 and a second dichroic mirror 6, to separate the white light collected by the condenser lens 4 into three color components, such as blue, green, and red; a first liquid crystal display 7, a second liquid crystal display 8, and a third liquid crystal display 9, each to modulate a respective color component with image information; a beam combining prism 10 to combine the separately colored components that have been modulated with image information by the respective liquid crystal display; and a projection lens 11 to form an image on a screen (not illustrated) using the combined beam. Arranged on the light path between the integrator 3 and the condenser lens 4 is an optional total-reflection mirror 12 which folds the beam, allowing the projector to be more compact.

When the reflector 2 is a parabolic mirror, the parabolic mirror is positioned with its focal point at the emission source of the emitter 1. With such an arrangement, the parabolic mirror reflects part of the white light flux emitted from the emitter 1 in the backward direction so as to travel in the forward direction approximately parallel to the optical axis Lo.

The integrator 3 is equipped with first lenticular lens array (i.e, fly's eye lens) 3A to operate on the light flux from the emitter 1, and a second lenticular lens array 3B to superimpose each light flux from the first lenticular lens array 3A onto each of the liquid crystal displays 7, 8, and 9. Thus, the light is homogenized throughout a plane normal to the optical axis. Also, on the rear side of the second lenticular lens array 3B, a polarizing beam splitter (hereinafter PBS) 13 is installed to separate the light flux homogenized by the integrator 3 into P-polarized light and S-polarized light, and to convert both polarizations to a single polarization. The fact that the beam from the emitter 1 that is reflected by the parabolic mirror is approximately collimated serves to lessen the reduction in brightness of the projected image in the peripheral regions of the image.

There are numerous ways of using color selective mirrors, such as a first dichroic mirror 5 and a second dichroic mirror 6, to separate different color components of the incident light, depending on the reflection characteristics of the color selective mirrors and their arrangement. As one example, in this embodiment a first dichroic mirror 5 separates the light flux homogenized by the integrator 3 and linearly polarized by the PBS 13 into a blue component LB and the remainder components (combined components LG and LR). The second dichroic mirror 6 separates the combined components LG and LR into the green component LG and the red component LR. Each color component is then projected onto a respective liquid crystal display 7, 8, or 9 where each beam is modulated with image information for that color.

As shown in FIG. 1, on the light path of the blue component LB (formed by being reflected by the first dichroic mirror 5) are arranged a first mirror 14 to totally reflect the blue component, and a field lens 15 to collimate the light reflected by the first mirror 14. Then the blue component LB is incident orthogonally onto the first liquid crystal display 7, which spatially modulates the blue component according to the blue colors of a multicolor image to be displayed.

Also, as shown in FIG. 1, on the light path of the green component LG (formed by being reflected by the second dichroic mirror 6) is arranged a field lens 16 to collimate the green component LG. The green component LG is then incident orthogonally onto the second liquid crystal display 8 which spatially modulates the green component according to the green colors of a multicolor image to be displayed.

And, as shown in FIG. 1, on the light path of the red component LR (formed by being transmitted through the second dichroic mirror 6) are arranged a second mirror 17 and a third mirror 18 to totally reflect the red component LR. Field lenses 19 and 20 serve to collimate the red component LR so that it can be made orthogonally incident onto the third liquid crystal display 9 which spatially modulates the red component according to the red colors of a multicolor image to be displayed.

Of the three light paths in the projection optical system, only the red component LR has a different light path length from the emitter 1 to the beam combining prism 10. Between the second mirror 17 and the third mirror 18, is arranged a relay lens 21, and this relay lens 21 makes a correction so that the apparent distance of the emitter 1 is the same for all light paths.

The beam combining prism 10 is a cross-mirror type prism which has a dichroic mirror 10B to reflect the blue component LB and a dichroic mirror 10R which reflects the red component LR. In the liquid crystal projector, the projection lens 11 is exchangeable. For example, any of three lenses having a short-focus, a medium-focus, or a long-focus can be attached depending upon the magnification desired in the displayed image.

In a liquid crystal projector of the known prior art, on-axis chromatic aberration is corrected by adjusting each of the respective distances from the liquid crystal displays 7, 8, and 9 to the projection lens 11. Because the reduction side of the projection lens is made to be approximately telecentric, no problem arises even if each distance from a particular liquid crystal display to the projection lens is different. However, from such an adjusted state, if the projection lens 11 is changed to one which has a different focal length, on-axis chromatic aberration occurs anew. When the projection lens is changed to one having a long focal length, i.e., a telescopic lens, the occurrence of on-axis chromatic aberration will be so severe that it can't be ignored.

Because it is difficult to perform adjustment of the distance from each liquid crystal display to the projection lens every time the projection lens 11 is replaced with one of a different focal length, it is desirable to adopt a different method of suppressing the occurrence of on-axis chromatic aberration. When a standard projection lens 11 (i.e., the one of medium focal length) is attached, no parallel-plane glass plates or parallel-plane glass plates 27, 28, and 29 having an identical thickness (e.g, 1 mm) are inserted, but when the projection lens 11 is exchanged to one having a longer or shorter focal length, the thickness of at least one of the parallel-plane glass plates 27, 28, and 29 is changed. The apparent distance from the light emitter 1 to the beam combining prism 10 decreases as the thickness of the parallel-plane glass plate increases. The ideal thickness T1 of each of the parallel-plane glass plates 27, 28, and 29 to be inserted into the system is expressed by the following equation:

$$T1 = T0 - (H \times N) \quad \text{Equation (1)}$$

where

- T0 is the thickness of the parallel-plane glass plate when the standard projection lens (medium focal length) is attached,
- H is the amount of on-axis chromatic aberration needed to correct the image, and
- N is the refractive index of the parallel-plane glass plate.

As an example, when T0 is 1.0 mm, the refractive index N of the parallel-plane glass plate is 1.52, and the amount H of on-axis chromatic aberration to correct the image is +0.15 mm, T1=0.772 mm is obtained using Equation 1. Thus the thickness of the parallel-plane glass plate needed is 0.772 mm, in lieu of the parallel-plane glass plate of 1 mm In this example, positive chromatic aberration is corrected. When correcting negative chromatic aberration, the parallel-plane glass plate of 1 mm should be replaced with a thicker plate, contrary to the above case where a thinner plate is used. Alternatively, no plate (i.e, T0=0.0) may be used for the standard lens, but only where negative chromatic aberration is encountered using the projection lens(es) of different focal length, thereby reducing the number of plates needed and making the correction plate(s) for the replacement projection lens(es) to be thinner.

Although in this embodiment a parallel-plane glass plate made of the same material is used, in this case of the identical glass wherein the index of refraction is identical for each transparent plate, the materials of the transparent plates may be selected at will by those of ordinary skill in the art, so long as the thickness in the above formula is adjusted for the change in refractive index of the new material, according to the formula:

$$T1=((T0/N)-H)\times N1) \quad \text{Equation (2)}$$

where N1 is the refractive index of the new material.

EMBODIMENT 2

Figure 2:
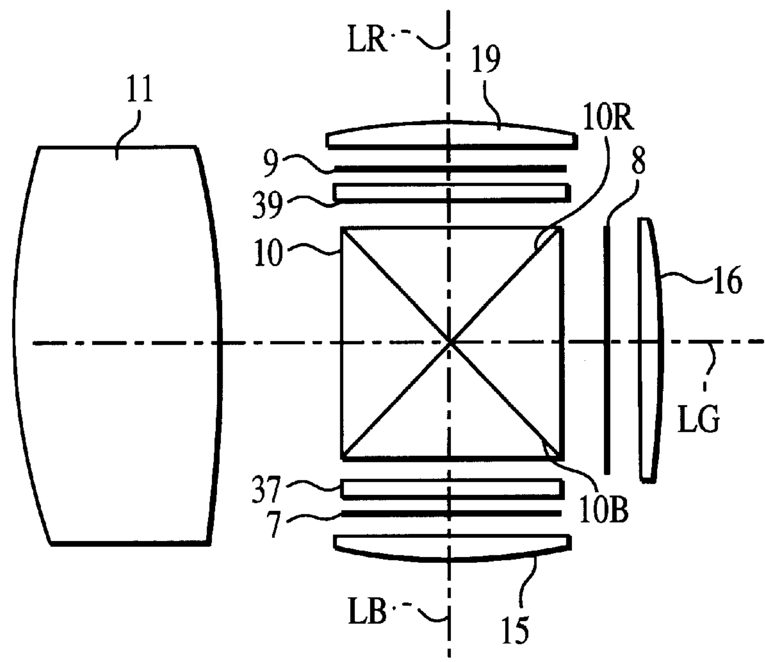
FIG. 2 shows the structure of a portion of a projector according to Embodiment 2, the other portions of the projector being identical to that shown in FIG. 1.

This embodiment is shown in FIG. 2, wherein only the optical components near the beam combining prism are shown, as there is no difference in the remaining components from those shown in Embodiment 1. This embodiment differs from that shown in FIG. 1, in that parallel-plane glass plates 37, 39 are inserted into only two of the three component beams (red and blue, for example). In this embodiment, on-axis chromatic aberration can be corrected for three components by using a lens designed to image one of the color components and by using a parallel-plane glass plate to correct the on-axis chromatic aberration for the other two color components. Or, correction of on-axis chromatic aberration can be accomplished for only the two color components having the greater influence by simply using two parallel-plane glass plates, as illustrated. It is also desirable that the holders for the plane-parallel glass plates (not shown) be such that plates of different thickness can be used. In this manner, when changing the projection lens to one having a different focal length, the correction plate can be replaced in each component beam in which a correction plate is used with another correction plate of proper thickness to correct the on-axis chromatic aberration for the projection lens being used.

EMBODIMENT 3

Figure 3:
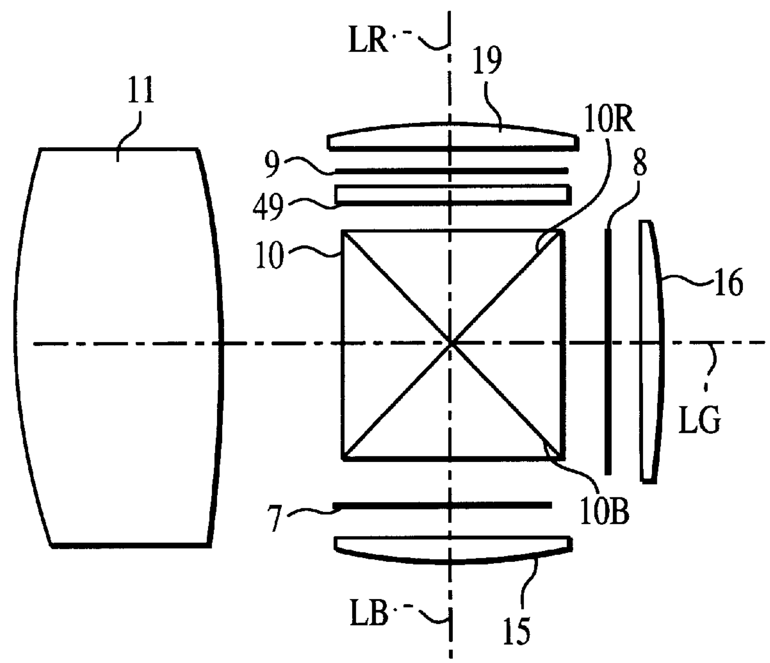
FIG. 3 shows the structure of a portion of a projector according to Embodiment 3, the other portions of the projector being identical to that shown in FIG. 1.

This embodiment is shown in FIG. 3, wherein only the optical components near the beam combining prism are shown, as there is no difference in the remaining components from those shown in Embodiment 1. This embodiment differs from that shown in FIGS. 1 and 2 in that a parallel-plane glass plate is inserted into only one of the three component beams (red or blue, for example). Thus, correction of on-axis chromatic aberration using a parallel-plane glass plate can be performed for only the color component having an especially large on-axis chromatic aberration. Or, on-axis chromatic aberration can be corrected for two components by using a lens designed to correct for a specified color component and by using a parallel-plane glass plate to correct for one of the other color components. When the parallel-plane glass plate is used to correct for only one color component, it is generally most effective if the parallel-plane glass plate 49 is inserted in the red component beam. This is because it is more difficult to design a lens that removes on-axis chromatic aberration for polychromatic light in the case where the polychromatic light includes red components. It is also desirable that the holder (not illustrated) for the plane-parallel glass plate be such that plates of different thickness can be substituted. In this manner, when changing the projection lens to one having a different focal length, the correction plate can be replaced by another of proper thickness to correct the on-axis spherical aberration for the projection lens being used.

As explained above, in the projector of this invention, a transparent plate that corrects on-axis chromatic aberration of at least one of the component beams is arranged between the optical modulator for that color component and the beam combining optical system. Therefore, when replacing the projection lens with one of a different focal length, one may replace a single transparent plate having a different thickness. In this way on-axis chromatic aberration can be sufficiently corrected at low cost compared to using an achromatic lens that corrects for all color components. Or, alternatively, a plane-parallel glass plate can be used in each of two beams to correct each of two component beams, leaving the third component beam uncorrected or corrected by using a projection lens designed to image at the wavelength of the other component.

The invention being thus described, it will be obvious that the same may be varied in many ways. For example, although a parallel-plane glass plate is used as the transparent plate in the above embodiments, plates made of other transparent materials such as plastic, etc., can be used instead. Also, it is possible to employ a different modulator than a liquid crystal display, such as a digital mirror device, deformable mirror device, etc. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A projector apparatus comprising:

three optical modulators, each for modulating a different color component light beam with image information for said color component;

a beam combining optical system which synthesizes the output from the three optical modulators into a combined beam;

a projection lens that is approximately telecentric on its reduction side and which magnifies and projects the output from the beam combining optical system onto a screen; and a transparent plate, positioned between an optical modulator for at least one of the different color component light beams and the beam combining optical system, said transparent plate being of a thickness to correct the on-axis chromatic aberration that occurs for the color component in which said plate is positioned, wherein only one transparent plate is provided, and said plate is positioned between an optical modulator that modulates red-colored light and said beam combining optical system.

2. The projector apparatus of claim 1, wherein said transparent plate is a parallel-plane glass plate.

3. The projector apparatus of claim 1, wherein said optical modulator is a liquid crystal display.

4. The projector apparatus of claim 2, wherein said optical modulator is a liquid crystal display.

5. A projector apparatus comprising:

three optical modulators, each for modulating a different color component light beam with image information for said color component;

a beam combining optical system which synthesizes the output from the three optical modulators into a combined beam;

a projection lens that is approximately telecentric on its reduction side and which magnifies and projects the output from the beam combining optical system onto a screen; and a transparent plate, positioned between an optical modulator for at least one of the different color component light beams and the beam combining optical system, said transparent plate being of a thickness to correct the on-axis chromatic aberration that occurs for the color component in which said plate is positioned, said apparatus constructed so that said transparent plate is replaceable with another of a different thickness or index of refraction when a different projection lens is used.

6. The projector apparatus of claim 1, said apparatus constructed so that said transparent plate is replaceable with another of a different thickness or index or refraction when a different projection lens is used.

7. A projector apparatus comprising:

three optical modulators, each for modulating a different color component light beam with image information for said color component;

a beam combining optical system which synthesizes the output from the three optical modulators into a combined beam;

a projection lens that is approximately telecentric on its reduction side and which magnifies and projects the output from the beam combining optical system onto a screen; and a transparent plate, positioned between an optical modulator for at least one of the different color component light beams and the beam combining optical system, said transparent plate being of a thickness to correct the on-axis chromatic aberration that occurs for the color component in which said plate is positioned, said apparatus constructed so that said transparent plate is replaceable with another of a different thickness or index of refraction when a different projection lens is used.

8. The projector apparatus of claim 2, said apparatus constructed so that said transparent plate is replaceable with another of a different thickness or index of refraction when a different projection lens is used.

9. A method of suppressing on-axis chromatic aberration in a projector having projection lenses of different focal length which may selectively be used to display a color image at a selected magnification, said method comprising:

(a) providing at least one parallel-plane transparent plate in a component beam prior to combining different component beams to form a combined beam;

(b) changing said at least one parallel-plane transparent plate to a parallel-plane transparent plate of a different thickness or index of refraction which reduces or eliminates chromatic aberration when the projector lens is exchanged to one having a different focal length.

* * * * *

UNITED STATES PATENT AND TRADEMARK OFFICE
CERTIFICATE OF CORRECTION

PATENT NO : 6,137,635
DATED : Oct. 24, 2000
INVENTOR(S) : Nakazawa

It is certified that error appears in the above-identified patent and that said Letters Patent are hereby corrected as shown below:

At column 2, line 13, change "such as a" to - - such as - -;

At column 2, line 31, insert a comma after "prism";

In claim 7, at column 8, line 11, after "positioned," insert:

- - wherein said transparent plate is a parallel-plane glass plate, - -.

Signed and Sealed this

Fifteenth Day of May, 2001

Attest:

Nicholas P. Godici

NICHOLAS P. GODICI

*Attesting Officer* *Acting Director of the United States Patent and Trademark Office*